Patented Oct. 5, 1948

2,450,634

UNITED STATES PATENT OFFICE 2,450,634

PRODUCTION OF THIODIHYDRACRYLIC ACIDS

Russell T. Dean, Stamford, and Edwin O. Hook, Darien, Conn., assignors to American Cyanamid Company, New York, N. Y., a corporation of Maine No Drawing. Application August 29, 1942, Serial No. 456,712

3 Claims. (Cl. 260—537)

This invention relates to the synthesis of $\beta,\beta'$-thiodipropionic acids and is more particularly concerned with the preparation of thiodihydracrylic acid.

Previously, thiodihydracrylic acid has been prepared by the addition of hydrogen sulfide to acrylonitrile, the reaction being carried out under anhydrous conditions, and the reaction product being saponified to form the diacid. Another method which has been used involves the reaction of $\beta$-chloropropionic acid with sodium sulfide.

In accordance with the present invention, the $\beta,\beta'$-thiodipropionic acids may be synthesized in a simplified manner by reacting sodium sulfide with acrylic acid in an aqueous solution.

The following example is illustrative of the present process, parts being given by weight.

Example 1

Two thousand one hundred and sixty parts (9 mols) of $Na_2S \cdot 9H_2O$ was heated to 90° C. One thousand five hundred and seventy parts (18 mols) of 82.5% aqueous acrylic acid was added below the surface with rapid stirring. The temperature was kept below 110° C. by occasional cooling. Ten per cent excess $Na_2S \cdot 9H_2O$ was added near the end of the addition to insure maintenance of a pH above 9. The reaction required 1¼ hours.

The mixture was stirred and heated in a steam bath for an additional 1¼ hours, diluted with 2,600 parts of water, and acidified with 1020 parts (10 mols) of concentrated $H_2SO_4$ in 1000 parts of water. The solution was clarified while hot, cooled to 20° C., and the product centrifuged off, washed with cold water (500 parts) and dried. The yield was 1423 parts of thiohydracrylic acid ($\beta,\beta'$-thiodipropionic acid), or 89.2% of the theoretical. Purity=100% (from acid No.).

The same method is suitable for the preparation of other $\beta,\beta'$-thiodipropionic acids by reacting, in aqueous solution, sodium sulfide with the corresponding water-soluble $\alpha,\beta$ unsaturated aliphatic acid. In place of the acrylic acid, there may be used suitable substituted acrylic acids, e. g., methacrylic, ethacrylic and other $\alpha$ substituted acrylic acids. Likewise, other alkali sulfides may be used in place of the sodium sulfide referred to above.

The acids of the present invention are suitable for many organic syntheses and are especially valuable as rubber plasticizers in the form of their esters.

Other suitable changes and variations may be made in carrying out the invention without departing from the spirit and scope thereof as defined in the appended claims.

We claim:

1. The process of preparing $\beta,\beta'$-thiodipropionic acid which comprises reacting at atmospheric pressures acrylic acid in aqueous solution with sodium sulfide under alkaline conditions and in the absence of stabilizing agents and treating the reaction product with sulfuric acid to liberate the free thiodipropionic acid.

2. The process of preparing $\beta,\beta'$-thiodipropionic acid which consists in reacting at atmospheric pressures acrylic acid in aqueous solution with sodium sulfide under alkaline conditions, treating the reaction product with sulfuric acid to liberate free $\beta,\beta'$-thiodipropionic acid, and recovering the latter.

3. The process of preparing $\beta,\beta'$-thiodipropionic acid which consists in reacting at atmospheric pressures and at temperatures of about 90–110° C., an aqueous mixture comprising sodium sulfide and acrylic acid in a molar ratio of about 1:2 for about one and one quarter hours at a pH above 9, heating the reaction product with sulfuric acid to liberate free $\beta,\beta'$-thiodipropionic acid, and recovering the latter.

RUSSELL T. DEAN.
EDWIN O. HOOK.

REFERENCES CITED

The following references are of record in the file of this patent:

UNITED STATES PATENTS

| Number | Name | Date |
|---|---|---|
| 2,163,176 | Keyssner | June 20, 1939 |
| 2,245,483 | Kirk | June 10, 1941 |
| 2,379,625 | Coes | July 3, 1945 |

FOREIGN PATENTS

| Number | Country | Date |
|---|---|---|
| 845,793 | France | Sept. 1, 1939 |

OTHER REFERENCES

Norris, "Organic Chemistry," McGraw-Hill (1922), page 122.